3,138,585
CERTAIN BIS-3,9-(1-AZIRIDINYL)-2,4,8,10-TET-
RAOXA - 3,9 - DIPHOSPHASPIRO[5.5]UNDEC-
ANE COMPOUNDS
Rudi F. W. Rätz, Hamden, Conn., assignor to Olin Math-
ieson Chemical Corporation, New Haven, Conn., a
corporation of Virginia
No Drawing. Filed Apr. 20, 1962, Ser. No. 188,948
6 Claims. (Cl. 260—239)

This invention relates to novel phosphorus containing compounds and to a process for their preparation. These novel compounds have the following general formula

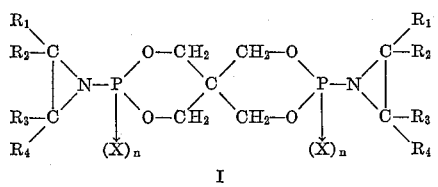

I wherein $R_1$, $R_2$, $R_3$ and $R_4$ are hydrogen, alkyl, e.g. methyl, ethyl, propyl, butyl, or aryl, e.g. phenyl, and X is selected from the group consisting of oxygen, sulfur and selenium and $n$ is an integer of from 0–1.

One of the important intermediates utilized in the work described herein is 3,9-dichloro-2,4,8,10-tetraoxa-3,9-diphosphaspiro[5.5]undecane-3,9-dioxide which is prepared in accordance with the process described in copending application S. N. 175,270, filed on February 22, 1962, wherein pentaerythritol is reacted with phosphoryl chloride. This compound is represented by the following structural formula

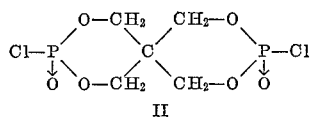

II

Another useful derivative for these preparations is 3,9-dichloro-2,4,8,10-tetraoxa - 3,9 - diphosphaspiro[5.5]undecane, the preparation of which has been described by Lucas et al. in J. Am. Chem. Soc. 72, 5491 (1950), wherein pentaerythritol is reacted with phosphorus trichloride. This compound has the formula

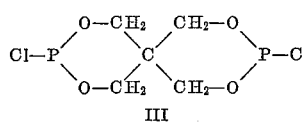

III

The preparation of the novel compounds described herein involves the use of ethylenimine and its homologs. These ethylenimines are represented by the following structural formula

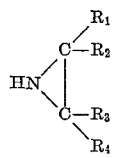

wherein $R_1$, $R_2$, $R_3$ and $R_4$ are hydrogen, alkyl, e.g. methyl, ethyl, propyl, butyl, or aryl, e.g. phenyl. Ethylenimines suitable for the reaction include, for example, ethylenimine, 2 - methylethylenimine, 2,2 - dimethyl - ethylenimine, 2-phenyl-ethylenimine, 2,3 - dimethylethylenimine, 2,3-diphenyl-ethylenimine, 2,2,3-triethylethylenimine and 2,2-diethyl-3-n-propyl-ethylenimine.

The desired aziridinyl derivatives containing the P→O group in both rings may be prepared in accordance with the following reaction.

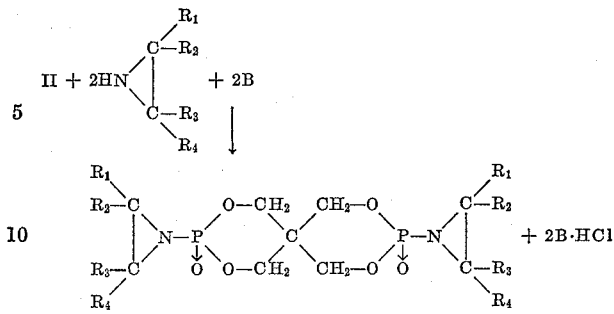

B in the above equation is a base which acts as an acid acceptor.

Other compounds covered by the general Formula I may be prepared as follows:

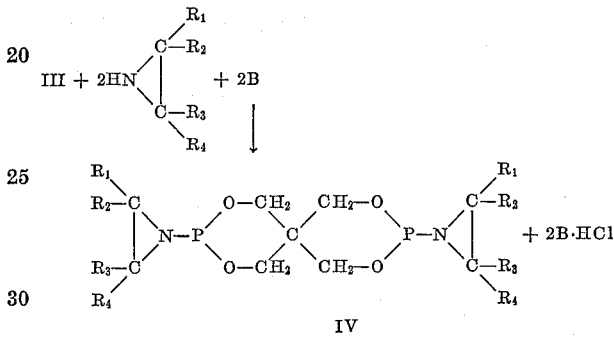

IV

These last derivatives (IV) can be reacted with sulfur or selenium to give other compounds covered by the general Formula I.

High yields of the desired aziridinyl derivatives can be obtained in accordance with the reactions outlined in the above equations. The following examples are illustrative of the compounds prepared and methods used herein. However, it is to be understood that these examples are only illustrative, and are not to be considered as limiting the scope of this invention in any manner.

*Example 1*

A solution of 10 g. of 3,9-dichloro-2,4,8,10-tetraoxa-3,9-diphosphaspiro[5.5]undecane-3,9-dioxide in 70 ml. of anhydrous cold dimethylacetamide was prepared and placed in a 250 ml. three-necked flask equipped with stirrer, dropping funnel and condenser. The flask was immersed in an ice water bath, and ethylenimine (7 g., 0.166 mole) was added dropwise to the flask with stirring over a twenty minute period. Separation of colorless crystals from the clear reaction mixture began approximately 30 minutes after the amine addition had been completed. After one additional hour of stirring at room temperature, the crystalline reaction product was collected on a Büchner funnel. After the crystalline product was recrystallized from absolute ethanol, shining colorless needles were obtained in an amount of 7 g. (67%). The melting point could not be determined by heating a sample on a Fisher-Johns block at the usual rate since the product suffers self-polymerization under such conditions. By using a preheated Fisher-Johns plate, 278° C. was the lowest temperature at which upon slight pressure on the upper cover glass a clear melt was obtained. Upon further heating however, this melt was transformed very rapidly into a colorless polymeric material with strong adhesion to the glass covers.

Analytical data indicated that the desired bis-3,9-(1-aziridinyl) - 2,4,8,10 - tetraoxa-3,9-diphosphaspiro[5.5] undecane-3,9-dioxide had been obtained after one recrystallization in high purity.

*Analysis.*—Calcd. for $C_9H_{16}N_2O_6P_2$: C, 34.8; H, 5.16; N, 9.04; P, 20.0. Found: C, 35.08, 35.12; H, 5.49, 5.43; N, 9.05, 9.26; P, 19.70.

Example 2

Into a 500 ml. three-necked flask equipped with stirrer, dropping funnel and condenser was placed 14.5 g. of 3,9-dichloro - 2,4,8,10-tetraoxa-3,9-diphosphaspiro[5.5]undecane which was suspended in 250 ml. of anhydrous ether. The reaction flask was immersed in an ice water bath, and 12.5 g. of triethylamine was added to the reaction flask. Then 6.5 g. of ethylenimine dissolved in 50 ml. of ether was added dropwise with stirring over a 30 minute period to the reaction flask. Stirring was continued for one hour longer with cooling and then for one additional hour at room temperature.

At this point, a considerable amount of solid material, mostly triethylamine hydrochloride, had separated from the reaction mixture. An additional 150 ml. of anhydrous ether was added as a diluent to the reaction flask before the solid was filtered. The dried filtered material weighed 22.3 g., and this material after washing twice with distilled water was reduced to 4.0 g. of a water-insoluble chlorine-free colorless crystallized product. The residual ethereal filtrate was distilled to dryness in vacuo, and the remaining solid material was washed twice with cold ethanol. Another 4 g. of water-insoluble chlorine-free crystalline material was obtained making a total of 8 g. of such material. This represented a 53% yield of bis - 3,9 - (1-aziridinyl)-2,4,8,10-tetraoxa-3,9-diphosphaspiro[5.5]undecane. Attempts to recrystallize this material from common solvents were unsuccessful. The material showed the same melting point characteristics as the product of Example 1, and on a preheated Fisher-Johns plate melting was observed at 172–174° C. followed by self-polymerization.

*Analysis.*—Calcd. for $C_9H_{16}N_2O_4P_2 \cdot H_2O$: C, 36.50; H, 6.09; N, 9.46; P, 20.9. Found: C, 36.84, 36.90; H, 6.01, 6.03; N, 9.18, 9.12; P, 20.4.

Example 3

A solution of 0.1 g. of flower of sulfur dissolved in 5 ml. of carbon disulfide was placed in a small reaction flask. A filtered solution of 0.436 g. of the compound prepared in Example 2 in 30 ml. of carbon disulfide was added to the reaction flask, and the mixture was allowed to stand. After 4 days an amount of 0.25 g. faintly yellowish crystals was obtained from the solution by filtration. Attempts to obtain a melting point on a Fisher-Johns plate beginning from room temperature were unsuccessful and at about 290° C. decomposition occurred. However on a preheated Fisher-Johns plate the solid melted at 220–223° C. upon slight pressure of the upper cover glass.

Analysis indicated that the product was the desired bis-3,9 - (1-aziridinyl) - 2,4,8,10 - tetraoxa-3,9-diphosphaspiro-[5.5]undecane-3,9-disulfide.

*Analysis.*—Calcd. for $C_9H_{16}N_2S_2O_4P_2$: C, 31.6; H, 4.68; N, 8.20; P, 18.1. Found: C, 31.45; H, 4.54; N, 8.81; P, 17.6.

Example 4

Into a 250 ml. three-necked flask equipped with stirrer, condenser and gas inlet tube was placed 200 ml. of anhydrous chloroform. The chlorform was saturated with ammonia gas at 0° C. Then 5.0 g. of 2-methyl-ethylenimine was charged into the reaction flask, and 11.2 g. of 3,9 - dichloro - 2,4,8,10 - tetraoxa-3,9-diphosphaspiro[5.5] undecane-3,9-dioxide (which had been recrystallized from glacial acetic acid) was added with stirring in 10 equal portions over a period of 50 minutes. After this addition was completed, the mixture was stirred for two additional hours at 0° C. and then allowed to stand at room temperature overnight. A chloroform insoluble material was removed from the reaction mixture by filtration, and this completely water-soluble material amounted to 8.2 g. and contained a theoretical amount of ammonium chloride (4.05 g.) beside some phosphorus-containing reaction product. The chloroform filtrate was then evaporated to dryness in vacuo at 40° C. leaving 8.5 g. of a colorless solid residue which was readily water-soluble and chlorine-free. This product was washed with ether and a free-flowing powder was obtained which was dissolved in boiling ethyl acetate. After cooling and filtration, the filtrate was evaporated to dryness leaving 6.0 g. (78.5% yield) of a colorless material. This material was recrystallized from carbon tetrachloride resulting in colorless needles having a melting point of 165–166° C. Additional reaction product was obtained by extraction with cold ethanol or with refluxing carbon tetrachloride of the chloroform-insoluble portion.

Analytical data confirmed that bis-3,9-[1-(2-methylaziridinyl)] - 2,4,8,10 - tetraoxa-3,9-diphosphaspiro[5.5] undecane-3,9-dioxide had been obtained in high purity.

*Analysis.*—Calcd. for $C_{11}H_{20}N_2P_2O_6$: C, 39.03; H, 6.18; N, 8.44. Found: C, 39.22, 38.99; H, 6.00, 6.13; N, 8.30.

The foregoing examples illustrate the reaction of the dichlorides with various ethylenimides. These compounds are quite reactive with each other, and in each case the desired aziridinyl derivative has been obtained and isolated in good yield.

All the reactions described herein can be satisfactorily run at a temperature range of about 0° C. to 100° C. However a preferred reaction temperature of about 0° C. to 40° C. can be used. It has also been found that the reactions can be carried out successfully as reaction periods of from one to twenty-four hours, but a reaction period of from two to six hours is generally preferred.

If desired a molar excess of ethylenimine may be used during the reaction in which event the excess will serve as an acid acceptor and take up the by-product hydrochloric acid. However the preferred method is to eliminate the use of costly excess ethylenimine by the use of another acid acceptor. In this way only the theoretical amount of ethylenimine need be employed. Other acid acceptors which may be advantageously utilized are ammonia, tertiary amines such as triethylamine, and other compounds including pyridine, N-ethyl morpholine and dimethyl-acetamide etc.

The reaction is preferably controlled by the use of a solvent or diluent during the reaction period. Solvents and diluents which are useful are ethers and chlorinated hydrocarbons although other common solvents may be utilized assuming they are not reactive with the reaction components. It has been noted that dimethylacetamide is an excellent solvent for use in some of these reactions, and this compound also functions as an acid acceptor.

The novel organic phosphorus compounds covered by the general Formula I are characterized by marked biological activity and have special utility as insect sterilants. For example bis-3,9-(1-aziridinyl)-2,4,8,10-tetraoxa-3,9-diphosphaspiro[5.5]undecane-3,9-dioxide, the compound prepared in Example 1, has exhibited unusually high activity as a sterilant. The following procedure has established the activity of this compound.

A bait was prepared by dissolving 0.5 g. of the above compound in 50 cc. of chloroform. This solution was blended with 100 g. of granulated sucrose, the solvent evaporated, and the residual solid reground in a mortar. The bait was then fed to flies 24 hours old, and this feeding was continued for five days. On the succeeding two days, eggs were collected from a prepared oviposition site and incubated for 24 hours at 75° F. These eggs were then inspected under a binocular microscope for "hatching." All "unhatched" eggs are considered non-viable or sterile, and the data was recorded as percent sterile eggs. Under the conditions of this procedure, a good sterilant should cause above 85% sterility at 0.5% concentration and this value is generally exceeded by compounds of this invention. For instance, the compound prepared in Example 1 showed a result of 96% sterility under these conditions.

The novel compounds of this invention are also useful as reactants with cellulose to impart very desirable permanent crease-proofing characteristics to cellulosic textile fabrics.

These compounds are also useful as cross linking agents in known plastics. They can also be reacted with polyfunctional alcohols and amines to form a series of hard resins.

What is claimed is:

1. Organic phosphorus compounds containing the bis-3,9-(1-aziridinyl)-2,4,8,10-tetraoxa - 3,9 - diphosphaspiro [5.5]undecane unit and having the formula

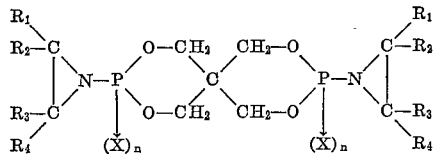

wherein $R_1$, $R_2$, $R_3$ and $R_4$ are selected from the group consisting of hydrogen, alkyl radicals of 1 to 4 carbon atoms and phenyl; wherein X is selected from the group consisting of oxygen, sulfur and selenium and $n$ is an integer of 0–1.

2. An organic phosphorus compound having the formula

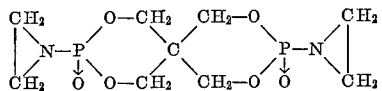

3. An organic phosphorus compound having the formula

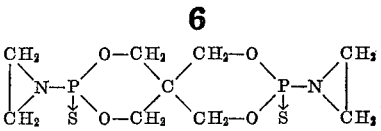

4. An organic phosphorus compound having the formula

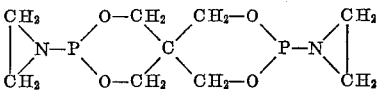

5. An organic phosphorus compound having the formula

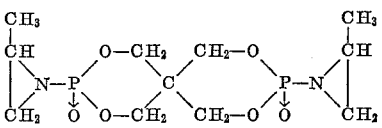

6. An organic phosphorus compound having the formula

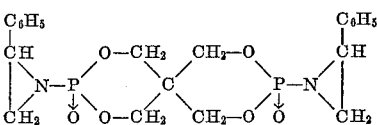

References Cited in the file of this patent

UNITED STATES PATENTS 2,802,823     Tolkmith et al. _____ Aug. 13, 1957

OTHER REFERENCES

Audrieth et al.: Non-Aqueous Solvents, 1953, John Wiley and Sons, Inc., New York, New York, page 146.

Lucas et al.: Jour. Amer. Chem. Soc., vol. 72, pp. 5491–97 (1950).

UNITED STATES PATENT OFFICE
CERTIFICATE OF CORRECTION

Patent No. 3,138,585 June 23, 1964

Rudi F. W. Rätz

It is hereby certified that error appears in the above numbered patent requiring correction and that the said Letters Patent should read as corrected below.

Column 1, lines 45 to 49, for that portion of the formula reading: $>\!\!P\text{-}C$ read $>\!\!P\text{-}Cl$ column 4, line 23, for "ethylenimides" read -- ethylenimines --; column 4, line 31, for "as" read -- at --.

Signed and sealed this 27th day of October 1964.

(SEAL)
Attest:

ERNEST W. SWIDER
Attesting Officer

EDWARD J. BRENNER
Commissioner of Patents